United States Patent
Namba et al.

(10) Patent No.: US 11,233,542 B2
(45) Date of Patent: Jan. 25, 2022

(54) RADIO CONTROL STATION APPARATUS AND CONTROL METHOD

(71) Applicant: SHARP KABUSHIKI KAISHA, Sakai (JP)

(72) Inventors: Hideo Namba, Sakai (JP); Hiromichi Tomeba, Sakai (JP); Yasuhiro Hamaguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 608 days.

(21) Appl. No.: 16/071,164

(22) PCT Filed: Jan. 18, 2017

(86) PCT No.: PCT/JP2017/001469
§ 371 (c)(1),
(2) Date: Jul. 19, 2018

(87) PCT Pub. No.: WO2017/126522
PCT Pub. Date: Jul. 27, 2017

(65) Prior Publication Data
US 2021/0050885 A1    Feb. 18, 2021

(30) Foreign Application Priority Data

Jan. 22, 2016  (JP) .............................. JP2016-010457

(51) Int. Cl.
*H04B 7/0408*  (2017.01)
*H04L 5/00*  (2006.01)
*H04W 16/28*  (2009.01)

(52) U.S. Cl.
CPC ......... *H04B 7/0408* (2013.01); *H04L 5/0055* (2013.01); *H04W 16/28* (2013.01)

(58) Field of Classification Search
CPC ..... H04B 7/0408; H04W 16/28; H04L 5/0055
See application file for complete search history.

(56) References Cited

U.S. PATENT DOCUMENTS 11,051,135 B2 * 6/2021 Wang .................. H04W 72/121
2003/0195017 A1 * 10/2003 Chen .................... H04B 7/0408
455/562.1
(Continued)

FOREIGN PATENT DOCUMENTS

| JP | 2014-527754 A | 10/2014 |
| JP | 2014-531811 A | 11/2014 |
| JP | 2015-521815 A | 7/2015 |

OTHER PUBLICATIONS

3rd Generation Partnership Project; Technical Specification Group Radio Access Network; Evolved Universal Terrestrial Radio Access (E-UTRA); Physical Channels and Modulation (Release 10);3GPP TS36.211 V10.7.0 (Feb. 2013).

*Primary Examiner* — Tejis Daya
(74) *Attorney, Agent, or Firm* — ScienBiziP, P.C.

(57) ABSTRACT

Communication efficiency can be enhanced during multiplex communication. A radio control station apparatus includes a multi-beam antenna unit capable of controlling each of a plurality of beam performances and an RF system for transmission. The RF system further includes a multiplexing unit configured to perform multiplexing by using a plurality of frequency channels or a plurality of sub-carriers, allocates at least one of the plurality of different frequency channels or at least one of the plurality of different sub-carriers to each of transmit signals to be transmitted to the plurality of radio terminal apparatuses, multiplexes the above allocated frequency channels or sub-carriers in the multiplexing unit, and transmits the multiplexed signal through the multi-beam antenna unit using a plurality of beams.

5 Claims, 11 Drawing Sheets

(56) References Cited

U.S. PATENT DOCUMENTS

| | | | |
|---|---|---|---|
| 2004/0090996 A1* | 5/2004 | Wu | H04N 21/658 |
| | | | 370/535 |
| 2004/0235472 A1* | 11/2004 | Fujishima | H04B 7/0408 |
| | | | 455/434 |
| 2006/0035605 A1* | 2/2006 | Ozluturk | H01Q 21/29 |
| | | | 455/101 |
| 2006/0153062 A1* | 7/2006 | Tanabe | H04L 27/2608 |
| | | | 370/208 |
| 2007/0248046 A1* | 10/2007 | Khan | H04L 5/0041 |
| | | | 370/329 |
| 2009/0010355 A1* | 1/2009 | Mori | H04B 7/0848 |
| | | | 375/267 |
| 2009/0161772 A1* | 6/2009 | Sawahashi | H04B 7/0617 |
| | | | 375/260 |
| 2010/0056217 A1* | 3/2010 | Montojo | H04W 28/18 |
| | | | 455/562.1 |
| 2013/0039401 A1 | 2/2013 | Han et al. | |
| 2013/0072247 A1* | 3/2013 | Park | H04B 7/043 |
| | | | 455/513 |
| 2013/0343303 A1* | 12/2013 | Kim | H04B 7/0617 |
| | | | 370/329 |
| 2014/0225777 A1* | 8/2014 | Harel | H01Q 21/061 |
| | | | 342/373 |
| 2015/0029919 A1* | 1/2015 | Han | H04W 48/16 |
| | | | 370/311 |
| 2019/0029040 A1* | 1/2019 | Sun | H04W 74/085 |

* cited by examiner

RADIO CONTROL STATION APPARATUS AND CONTROL METHOD

TECHNICAL FIELD

The present invention relates to a radio communication technology.

BACKGROUND ART

Recently, an amount of information communicated through radio networks such as a cellular network has been steadily increasing, and an amount of information handled by a single radio control station apparatus (also called a base station, an access point, or the like in some case) has also been increasing. In order to deal with the above issue, multiplexing techniques between radio terminal apparatuses (also called mobile station devices, user station devices, or the like in some case) are introduced, and multiplexing is performed by Time Division Multiplexing, Frequency Division Multiplexing, Code Division Multiplexing, or a combination of a plurality of these multiplexing schemes. In addition, in order to further enhance efficiency, a beamforming technique is introduced in which a beam direction of an antenna is controlled when transmission is carried out toward a radio terminal apparatus as a destination of communication, and thus reception performance of the radio terminal apparatus is improved. In the LTE standards, communication efficiency is improved by simultaneously using Frequency Division Multiplexing, Time Division Multiplexing, and beamforming (see NPL 1). In this system, a frequency resource is allocated to each of the radio terminal apparatuses, and at the same time, a phase configured for a signal on a frequency axis for each radio terminal apparatus is configured for each transmission antenna port (each RF system); the signal on the frequency axis is converted to a time axis signal for each antenna port, the time axis signal undergoes digital-analog (D/A) conversion, and then the signal is converted to an RF signal to be transmitted from the antenna; thereafter, the RF signal is amplified and transmitted from each antenna port.

CITATION LIST

Non Patent Document

[NON PATENT DOCUMENT 1] NPL 1: 3GPP TS36.211 V10.7.0 (2013-02)

DISCLOSURE OF THE INVENTION

Problems to be Solved by the Invention

However, the existing cellular system, in particular, the beamforming technique used in the LTE system needs different RF systems for each antenna; that is, to control N beams, N antenna elements and N RF systems need to be provided. Accordingly, there arises a problem that costs necessary for the RF systems increase as the frequency to be handled becomes higher, a problem that the structure of a passive-type phased array, which is simple in structure, distributes a single RF system and performs phase control on a distributed signal, cannot be used, and the like.

Means for Solving the Problems

According to an aspect of the present invention, provided is a radio control station apparatus used in a radio communication system that is constituted of the radio control station apparatus and a plurality of radio terminal apparatuses. The stated radio control station apparatus includes a multi-beam antenna unit capable of controlling each of a plurality of beam performances and an RF system for transmission. The RF system for transmission further includes a multiplexing unit configured to perform multiplexing by using a plurality of frequency channels or a plurality of sub-carriers, allocates at least one of the plurality of different frequency channels or at least one of the plurality of different sub-carriers to each of transmit signals to be transmitted to the plurality of radio terminal apparatuses, multiplexes the above allocated frequency channels or sub-carriers in the multiplexing unit, and transmits the multiplexed signal through the multi-beam antenna unit using a plurality of beams.

According to another aspect of the present invention, provided is a radio control station apparatus further configured to change, when any one of the beams of the multi-beam antenna unit is allocated to any one of the plurality of radio terminal apparatuses, the number of the frequency channels allocated to the above beam-allocated radio terminal apparatus in accordance with gain of the allocated beam.

According to another aspect of the present invention, provided is a radio control station apparatus in which the number of the RF systems for transmission is smaller than the number of the plurality of beams that can be controlled in the multi-beam antenna unit.

According to another aspect of the present invention, provided is a radio control station apparatus configured to change, when any one of the beams of the multi-beam antenna unit is allocated to any one of the plurality of radio terminal apparatuses, the number of the frequency channels allocated to the above beam-allocated radio terminal apparatus in accordance with gain of the allocated beam.

According to another aspect of the present invention, provided is a radio control station apparatus configured to receive, in a state in which a configuration at a time when transmit data was transmitted toward the plurality of radio terminal apparatuses to which the frequency channels or sub-carriers were allocated is configured in the multi-beam antenna unit, a signal from the plurality of radio terminal apparatuses to which the above frequency channels or sub-carriers were allocated.

According to another aspect of the present invention, provided is a radio control station apparatus configured to transmit a search packet with any one of the beams controlled by the multi-beam antenna unit.

According to another aspect of the present invention, provided is a radio control station apparatus in which the number of frequency channels used when the search packet is transmitted is one.

According to another aspect of the present invention, provided is a radio transmission method including the steps of: using an RF system for transmission further including a multi-beam antenna unit capable of controlling each of a plurality of beam performances, and a multiplexing unit configured to perform multiplexing by using a plurality of frequency channels or a plurality of sub-carriers; allocating at least one of the plurality of different frequency channels or at least one of the plurality of different sub-carriers to each of transmit signals to be transmitted to the plurality of radio terminal apparatuses; multiplexing the above allocated frequency channels or sub-carriers in the multiplexing unit; and transmitting the multiplexed signal through the multi-beam antenna unit using a plurality of beams.

Effects of the Invention

An Frequency Division Multiplexing is performed at the time of transmission from a radio control station apparatus to radio terminal apparatuses, and a plurality of beams are directed to the radio terminal apparatuses as the destinations of transmission, thereby making it possible to enhance the communication efficiency. In addition, by simultaneously controlling the gain, a beam width, a modulation scheme, frequency allocation, and the like of each beam when generating the plurality of beams, the communication efficiency can be enhanced.

MODE FOR CARRYING OUT THE INVENTION

Hereinafter, a radio communication technology according to an embodiment of the present invention will be described in detail with reference to the drawings.

First Embodiment

Figure 2:
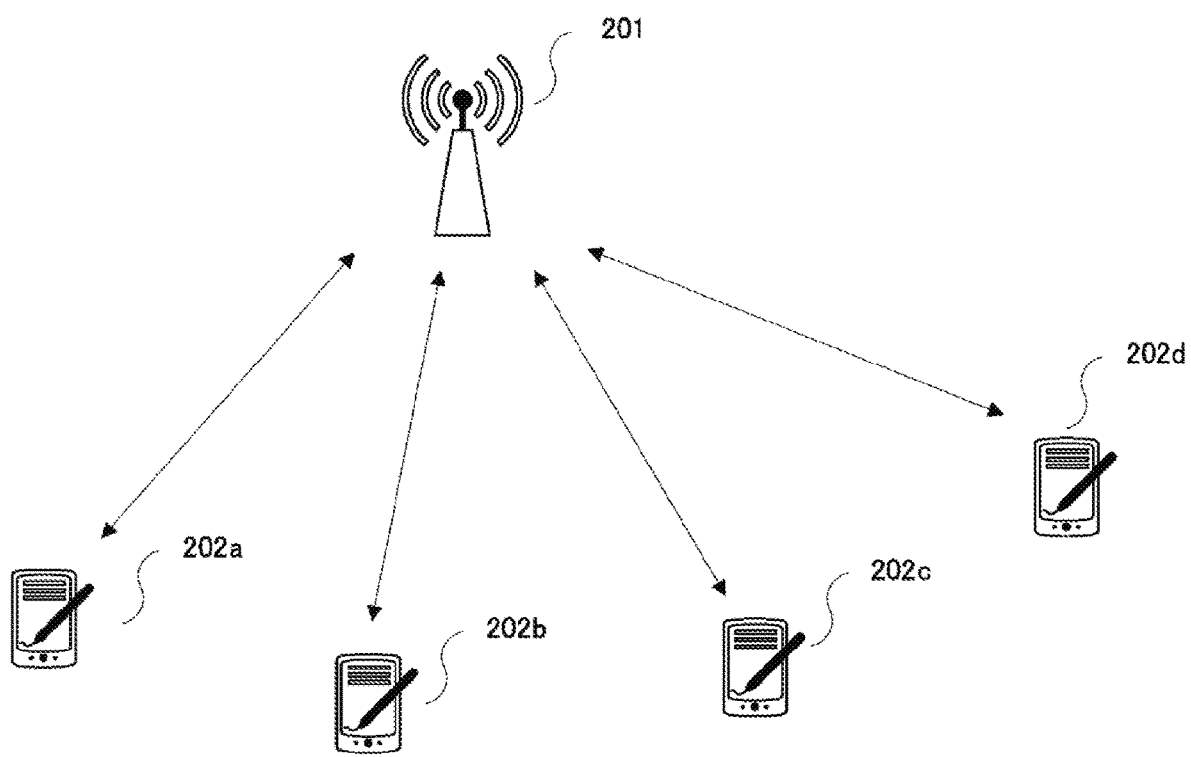
FIG. 2 is a diagram illustrating an example of a radio communication system used in the first embodiment of the present invention.

FIG. 2 schematically illustrates an example of a radio communication system to which this exemplary embodiment is applied. This radio communication system is constituted of a single radio control station apparatus 201 and a plurality of radio terminal apparatuses 202a to 202d. Although the number of radio terminal apparatuses used in this radio communication system is not limited to any specific number, the number of radio terminal apparatuses is four in this exemplary embodiment. Each of the radio terminal apparatuses 202a to 202d forms what is called a star topology, where each of the stated radio terminal apparatuses communicates with the radio control station apparatus 201. The radio control station is also referred to as a radio control station, a base station, an access point, or the like in some case, and the radio terminal apparatus is also referred to as a radio station device, a radio node device, or the like in some case.

Figure 3A:
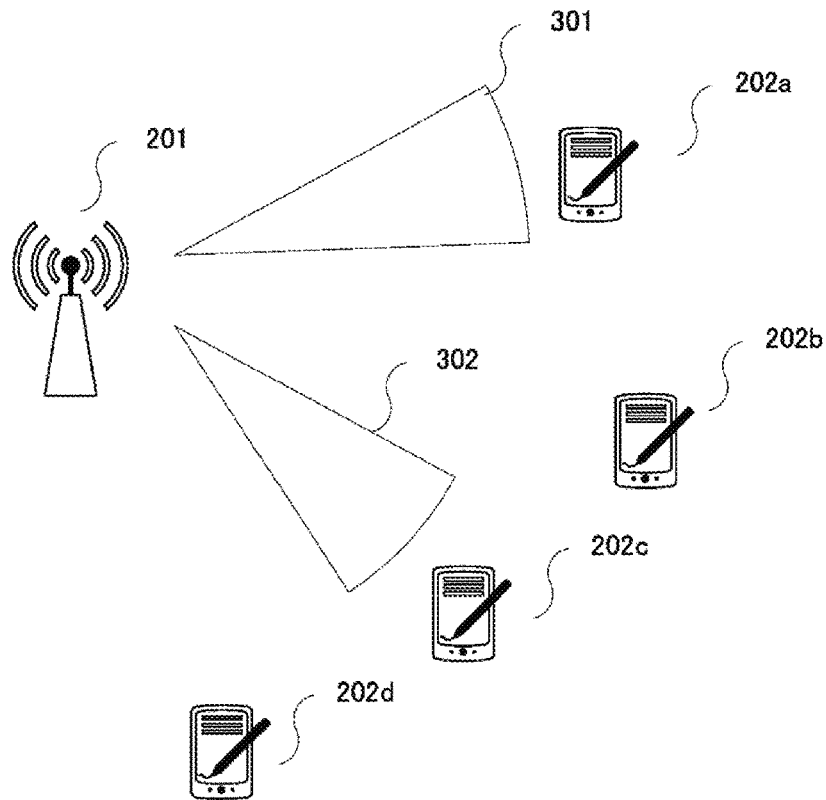
FIG. 3A is a diagram illustrating an example of beam control according to the first embodiment of the present invention.
Figure 3B:
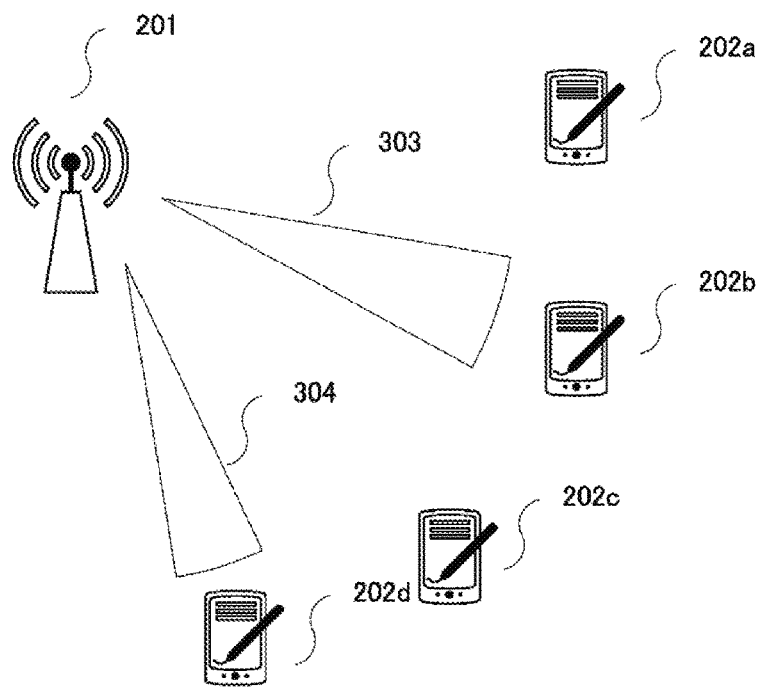
FIG. 3B is also a diagram illustrating an example of beam control according to the first embodiment of the present invention.

In a mode of the present invention, the radio control station apparatus uses a multi-beam antenna, communicates with a specific group of terminals at a certain time, directs a plurality of beams to each of the communication terminals, and then communicates with each of the terminals while making use of Frequency Division Multiplexing. Operations of one embodiment of the present invention will be generally described below using FIG. 3A and FIG. 3B. In the present embodiment, the radio control station apparatus 201 simultaneously communicates with the radio terminal apparatus 202a and the radio terminal apparatus 202c at a certain time "a", and the radio control station apparatus 201 simultaneously communicates with the radio terminal apparatus 202b and the radio terminal apparatus 202d at a certain time "b". The radio control station apparatus 201 controls the beams of the multi-beam antenna included in the radio control station apparatus 201 at the time of communication. In this exemplary embodiment, the number of beams that can be controlled simultaneously is two. The radio control station apparatus 201 performs multiplex communication using a Frequency Division scheme when communicating with the plurality of radio terminal apparatuses at the same time. In this exemplary embodiment, the number of pieces of multiplexing is two. FIG. 3A schematically illustrates beam control at the time a, and FIG. 3B schematically illustrates beam control at the time b. At the time a, the radio control station apparatus 201 controls a beam 301, which is one of two existing beams, to be directed toward the radio terminal apparatus 202a, and controls another beam 302 to be directed toward the radio terminal apparatus 202c. At the time b, the radio control station apparatus 201 controls a beam 303, which is one of two existing beams, to be directed toward the radio terminal apparatus 202b, and controls another beam 304 to be directed toward the radio terminal apparatus 202d. The beam refers to a direction in which reception-transmission gain of the antenna is large, and the beam direction can be controlled by using an antenna such as a phased array antenna to be explained later.

A communication packet used in the Frequency Division Multiplexing will be generally described below with reference to FIG. 5. A communication band 514 can be divided into four frequency channels CH1, CH2, CH3 and CH4, which can be used individually. The modulation scheme is not limited to any specific one, and an OFDM/FDMA scheme (OFDMA scheme) may be used, in which a band to be used is easily controlled. Another multi-carrier scheme may be used, in which a frequency channel can be divided. It is unnecessary to limit the number of carriers or sub-carriers used in a frequency channel to any specific number; that is, the number of carriers or sub-carriers used in a certain frequency channel may be one, or the number of carriers or sub-carriers used in another frequency channel may be two or more. At the time of transmission by the radio control station apparatus, the radio control station apparatus transmits all the communication bands, that is, transmits all of the four frequency channels. When the radio terminal apparatus performs transmission, any one of the four frequency channels is used. "501" denotes a transmission packet transmitted by the radio control station apparatus, while "502" and "503" denote transmission packets transmitted by the radio terminal apparatuses.

The transmission packet 501 transmitted from the radio control station apparatus is constituted of a preamble 504, a header 505, a payload 1 of 506, a payload 2 of 507, a payload 3 of 508, and a payload 4 of 509. The preamble 504 is, when the radio terminal apparatus receives a signal transmitted from the radio control station apparatus, a prescribed signal for channel estimation of the received signal, and is transmitted using all the communication bands. The header 505 includes information indicating which of the radio terminal apparatuses the transmission packet 501 transmitted from the radio control station apparatus is destined for, information indicating which of the terminals the subsequent payloads from the payload 1 of 506 to the payload 4 of 509 are respectively destined for, information indicating the modulation schemes of each of the subsequent payloads from the payload 1 of 506 to the payload 4 of 509, information associated with the frequency channel to be used when the terminal having received the payload transmits an acknowledge response, and information associated with the order of transmitting the acknowledge responses. In a case where the radio control station apparatus is capable of demodulating each of the signals transmitted simultaneously by the plurality of radio terminal apparatuses, information giving an instruction to simultaneously transmit the acknowledge responses may be included. In addition to these information, other information such as radio control station information and retransmission control information may be included. The header 505 is transmitted by using a modulation scheme excellent in anti-error performance such as QPSK. The header 505, like the preamble 504, is also transmitted by making use of all the communication bands. The payloads from the payload 1 of 506 to the payload 4 of 509 include data for the radio terminal apparatuses as the destinations of transmission specified by the header 505. The payload 1 of 506 is transmitted through the frequency channel CH1, the payload 2 of 507 is transmitted through the channel CH2, the payload 3 of 508 is transmitted through the channel CH3, and the payload 4 is transmitted through the channel CH4. A plurality of payloads may be allocated to the radio terminal apparatuses of the same destination. The payloads from the payload 1 of 506 to the payload 4 of 509 are modulated and transmitted using the modulation schemes specified by the header 505. Each of the payloads may include, in addition to the communication data, information for error correction such as ACK information, control information for individual radio terminal apparatuses such as QoS control information, and the like. In the present embodiment, although the configuration is such that the header uses all the frequency channels, a configuration may be employed in which the number of channels necessary to send the header is one, and the same header is copied and transmitted by all the frequency channels, so that the number of channels necessary to receive the header is one at the reception side.

The radio terminal apparatuses specified, by the header 505, as the destinations of transmission of the payload 1 of 506 to the payload 4 of 509, transmit acknowledge response packets (ACK packets) to the radio control station apparatus, when the respective payloads specified by the header 505 are successfully received, in accordance with the order of transmission of the acknowledge responses included in the header. FIG. 5 illustrates an example in which the radio terminal apparatus specified first transmits an acknowledge response packet 502 using the frequency channel CH1, and the radio terminal apparatus specified next transmits an acknowledge response packet 503 using the frequency channel CH3. The acknowledge response packets are respectively constituted of preambles 510 and 512, which are known signals used by the radio control station apparatus for channel estimation of the signals transmitted by the radio terminal apparatuses, and ACK sections 511 and 513, following the preambles 510 and 512, for indicating that the packets are acknowledge responses. In a case where a payload is unsuccessfully received, not an acknowledge response but information indicating an unsuccessful reception (NACK) may be transmitted. Moreover, in the case where a payload is unsuccessfully received, the unsuccessful reception of the payload may be indicated by not transmitting an ACK packet.

Figure 6A:
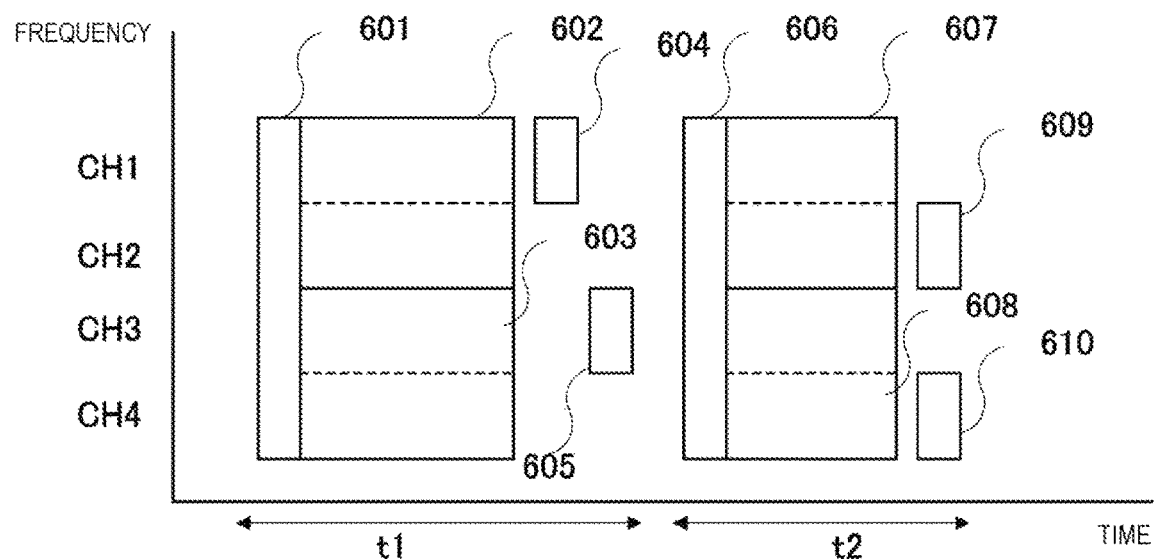
FIG. 6A is a diagram illustrating an example of multiplexing control performed in the first embodiment of the present invention.
Figure 6B:
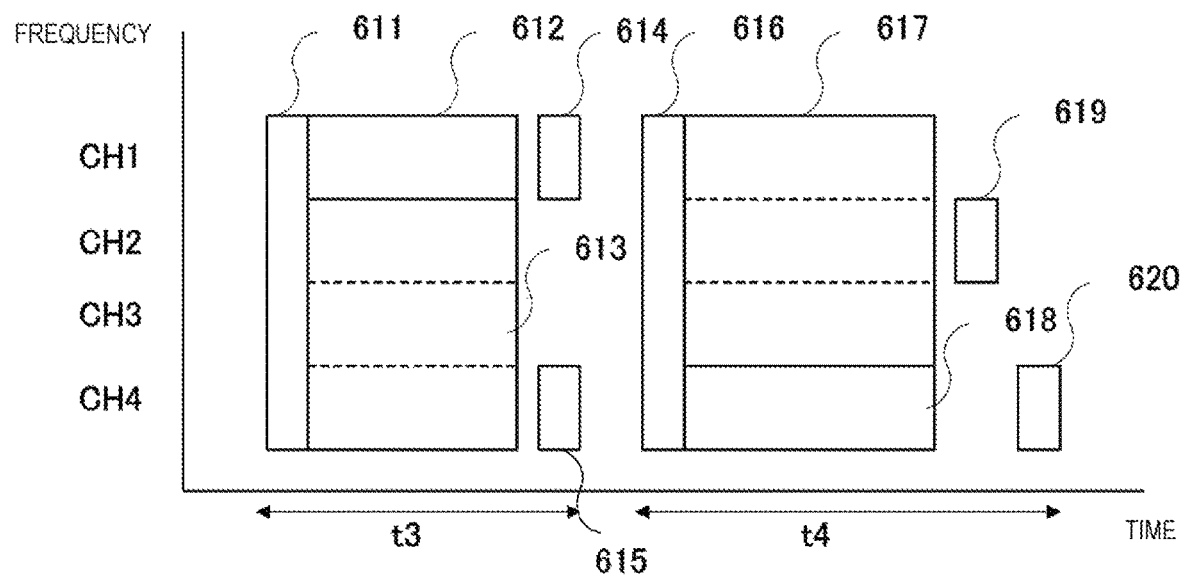
FIG. 6B is also a diagram illustrating an example of multiplexing control performed in the first embodiment of the present invention.

When the radio terminal apparatuses 202a to 202d connect with the radio control station apparatus 201, the radio control station apparatus 201 measures in advance the directions in which the respective radio terminal apparatuses are disposed. The direction estimation method is not limited to any specific one, and a method similar to a beamforming procedure used in IEEE802.11ad can be used, for example. In the present embodiment, beam direction control is performed only at the radio control station apparatus side. However, like in IEEE802.11ad, beams on the radio terminal apparatus side may be controlled separately by another method. Further, at the same time, channels between the radio control station apparatus 201 and the respective radio terminal apparatuses 202a to 202d are estimated, and modulation schemes usable at the time of payload transmission are estimated beforehand. Thereafter, in accordance with a situation in which data to be transmitted from the radio control station apparatus 201 to the respective radio terminal apparatuses 202a through 202d is generated, the generated data is transmitted to the radio terminal apparatuses 202a through 202d. In the case where transmission data is generated for the plurality of radio terminal apparatuses, the plurality of beams are controlled and the transmission is performed by Frequency Division Multiplexing. Each of FIGS. 6A and 6B illustrates an example of a transmission method by Frequency Division in a case where data to be transmitted from the radio control station apparatus 201 to all of the radio terminal apparatuses 202a through 202d is generated. FIG. 6A illustrates an example of a case in which frequency channels of the same number are allocated to each of the radio terminal apparatuses in which the transmission is two-multiplexed, and FIG. 6B illustrates an example of a case in which frequency channels of different numbers are allocated to each of the terminals in which the transmission is two-multiplexed.

In FIG. 6A, a time t1 represents a period during which transmission from the radio control station apparatus 201 to the radio terminal apparatus 202a and the radio terminal apparatus 202c is performed being multiplexed, and a time t2 represents a time during which transmission from the radio control station apparatus 201 to the radio terminal apparatus 202b and the radio terminal apparatus 202d is performed being multiplexed. At the same time as the time when the time t1 starts, the radio control station apparatus 201 controls beams so that one of the beams is directed toward the radio terminal apparatus 202a and another beam is directed toward the radio terminal apparatus 202c. Thereafter, the radio control station apparatus 201 transmits a header 601 including information in which the radio control station apparatus 201 specifies that the destination of payloads to be transmitted to the frequency channels CH1 and CH2 is the radio terminal apparatus 202a, specifies that the destination of payloads to be transmitted to the frequency channels CH3 and CH4 is the radio terminal apparatus 202c, specifies modulation schemes of the respective payloads based on the previously estimated modulation schemes, specifies the transmission order of ACK packets in such a manner that the transmission is performed in the order of the ACK packet of the radio terminal apparatus 202a and the ACK packet of the radio terminal apparatus 202c, specifies that a frequency channel of the ACK packet transmitted by the radio terminal apparatus 202a is the channel CH1, and specifies that a frequency channel of the ACK packet transmitted by the radio terminal apparatus 202c is the channel CH3. Following the transmission of the header 601, the data destined for the radio terminal apparatus 202a is transmitted with the payloads, indicated by a reference sign of 602, of the frequency channel CH1 and the frequency channel CH2, and the data destined for the radio terminal apparatus 202c is transmitted with the payloads, indicated by a reference sign of 603, of the frequency channel CH3 and the frequency channel CH4. When the radio terminal apparatus 202a receives the signal transmitted from the radio control station apparatus 201, the radio terminal apparatus 202a decodes the header 601, further decodes the payloads of the frequency channels CH1 and CH2 destined for the terminal itself based on the information included in the header 601, and transmits an ACK packet as of 604 with the frequency channel CH1 in the case where the decoding has been successfully carried out. When the radio terminal apparatus 202c receives the signal transmitted from the radio control station apparatus 201, the radio terminal apparatus 202c decodes the header 601, further decodes the payloads of the frequency channels CH3 and CH4 destined for the terminal itself based on the information included in the header 601, and transmits an ACK packet as of 605, shortly after an expected time of completion of the ACK packet transmission carried out by the radio terminal apparatus 202a, with the frequency channel CH3 in the case where the decoding has been successfully carried out.

At the same time as the time when the time t2 starts, the radio control station apparatus 201 controls beams so that one of the beams is directed toward the radio terminal apparatus 202b and another beam is directed toward the radio terminal apparatus 202d. Thereafter, the radio control station apparatus 201 transmits a header 606 including information in which the radio control station apparatus 201 specifies that the destination of payloads to be transmitted to the frequency channels CH1 and CH2 is the radio terminal apparatus 202b, specifies that the destination of payloads to be transmitted to the frequency channels CH3 and CH4 is the radio terminal apparatus 202d, specifies modulation schemes of the respective payloads based on the previously estimated modulation schemes, specifies that the radio terminal apparatus 202b and the radio terminal apparatus 202d transmit ACK packets at the same time, specifies that a frequency channel of the ACK packet transmitted by the radio terminal apparatus 202b is the channel CH2, and specifies that a frequency channel of the ACK packet transmitted by the radio terminal apparatus 202d is the channel CH4. Following the transmission of the header 606, the data destined for the radio terminal apparatus 202b is transmitted with the payloads, indicated by a reference sign of 607, of the frequency channel CH1 and the frequency channel CH2, and the data destined for the radio terminal apparatus 202d is transmitted with the payloads, indicated by a reference sign of 608, of the frequency channel CH3 and the frequency channel CH4. When the radio terminal apparatus 202b receives the signal transmitted from the radio control station apparatus 201, the radio terminal apparatus 202b decodes the header 606, further decodes the payloads of the frequency channels CH1 and CH2 destined for the terminal itself based on the information included in the header 606, and transmits an ACK packet as of 609 with the frequency channel CH2 in the case where the decoding has been successfully carried out. When the radio terminal apparatus 202d receives the signal transmitted from the radio control station apparatus 201, the radio terminal apparatus 202d decodes the header 606, further decodes the payloads of the frequency channels CH3 and CH4 destined for the terminal itself based on the information included in the header 606, and transmits an ACK packet as of 610 with the frequency channel CH4 in the case where the decoding has been successfully carried out.

In FIG. 6B, a time t3 represents a period during which transmission from the radio control station apparatus 201 to the radio terminal apparatus 202a and the radio terminal apparatus 202c is performed being multiplexed, and a time t4 represents a time during which transmission from the radio control station apparatus 201 to the radio terminal apparatus 202b and the radio terminal apparatus 202d is performed being multiplexed. At the same time as the time when the time t3 starts, the radio control station apparatus 201 controls beams so that one of the beams is directed toward the radio terminal apparatus 202a and another beam is directed toward the radio terminal apparatus 202c. Thereafter, the radio control station apparatus 201 transmits a header 611 including information in which the radio control station apparatus 201 specifies that the destination of a payload to be transmitted to the frequency channel CH1 is the radio terminal apparatus 202a, specifies that the destination of payloads to be transmitted to the frequency channels CH2, CH3, and CH4 is the radio terminal apparatus 202c, specifies modulation schemes of the respective payloads based on the previously estimated modulation schemes, specifies that the radio terminal apparatus 202a and the radio terminal apparatus 202c transmit ACK packets at the same time, specifies that a frequency channel of the ACK packet transmitted by the radio terminal apparatus 202a is the channel CH1, and specifies that a frequency channel of the ACK packet transmitted by the radio terminal apparatus 202c is the channel CH4. Following the transmission of the header 611, the data destined for the radio terminal apparatus 202a is transmitted with the payload, indicated by a reference sign of 612, of the frequency channel CH1, and the data destined for the radio terminal apparatus 202c is transmitted with the payloads, indicated by a reference sign of 613, of the frequency channels CH2, CH3, and CH4. When the radio terminal apparatus 202a receives the signal transmitted from the radio control station apparatus 211, the radio terminal apparatus 202a decodes the header 601, further decodes the payload of the frequency channel CH1 destined for the terminal itself based on the information included in the header 601, and transmits an ACK packet as of 614 with the frequency channel CH1 in the case where the decoding has been successfully carried out. When the radio terminal apparatus 202c receives the signal transmitted from the radio control station apparatus 201, the radio terminal apparatus 202c decodes the header 611, further decodes the payloads of the frequency channels CH2, CH3, and CH4 destined for the terminal itself based on the information included in the header 611, and transmits an ACK packet as of 615 with the frequency channel CH4 in the case where the decoding has been successfully carried out.

At the same time as the time when the time 4 starts, the radio control station apparatus 201 controls beams so that one of the beams is directed toward the radio terminal apparatus 202b and another beam is directed toward the radio terminal apparatus 202d. Thereafter, the radio control station apparatus 201 transmits a header 616 including information in which the radio control station apparatus 201 specifies that the destination of payloads to be transmitted to the frequency channels CH1, CH2, and CH3 is the radio terminal apparatus 202b, specifies that the destination of a payload to be transmitted to the frequency channel CH4 is the radio terminal apparatus 202d, specifies modulation schemes of the respective payloads based on the previously estimated modulation schemes, specifies the transmission order of ACK packets in such a manner that the transmission is performed in the order of the ACK packet of the radio terminal apparatus 202b and the ACK packet of the radio terminal apparatus 202d, specifies that a frequency channel of the ACK packet transmitted by the radio terminal apparatus 202b is the channel CH2, and specifies that a frequency channel of the ACK packet transmitted by the radio terminal apparatus 202d is the channel CH4. Following the transmission of the header 616, the data destined for the radio terminal apparatus 202b is transmitted with the payloads, indicated by a reference sign of 617, of the frequency channels CH1, CH2, and CH3, and the data destined for the radio terminal apparatus 202d is transmitted with the payload, indicated by a reference sign of 618, of the frequency channel CH4. When the radio terminal apparatus 202b receives the signal transmitted from the radio control station apparatus 201, the radio terminal apparatus 202b decodes the header 616, further decodes the payloads of the frequency channels CH1, CH2, and CH3 destined for the terminal itself based on the information included in the header 616, and transmits an ACK packet as of 619 with the frequency channel CH2 in the case where the decoding has been successfully carried out. When the radio terminal apparatus 202d receives the signal transmitted from the radio control station apparatus 201, the radio terminal apparatus 202d decodes the header 616, further decodes the payload of the frequency channel CH4 destined for the terminal itself based on the information included in the header 616, and transmits an ACK packet as of 620, shortly after an expected time of completion of the ACK packet transmission carried out by the radio terminal apparatus 202d, with the frequency channel CH4 in the case where the decoding has been successfully carried out.

How to determine the number of frequency channels used by the radio control station apparatus 201 when performing multiplexing transmission is not particularly specified. The number of frequency channels may be determined based on the magnitude of the amount of information destined for the respective radio terminal apparatuses, based on estimated channel state information from the radio control station apparatus 201 to the respective radio terminal apparatuses 201a through 201d, or based on the gain of beams obtained from a result of beam control. As an example, a method can be cited in which, when the beam gain is large, the number of frequency channels for use is decreased and the modulation order is increased, and when the beam gain is small, the number of frequency channels for use is increased and the modulation order is decreased. In a case where there is a possibility that a certain radio terminal apparatus moves, a modulation order that copes with a decrease in beam gain may be used by configuring a beam corresponding to the radio terminal apparatus expected to move to have a wide width (make a half-value angle of the beam larger) so that the width of the beam is widened. Further, in order to effectively make use of a frequency-multiplexed scheme, the gain of the beam, the number of frequency channels for use, and the modulation order may be changed in such a manner that the transmission periods of the data transmitted being multiplexed become substantially the same.

Figure 1:
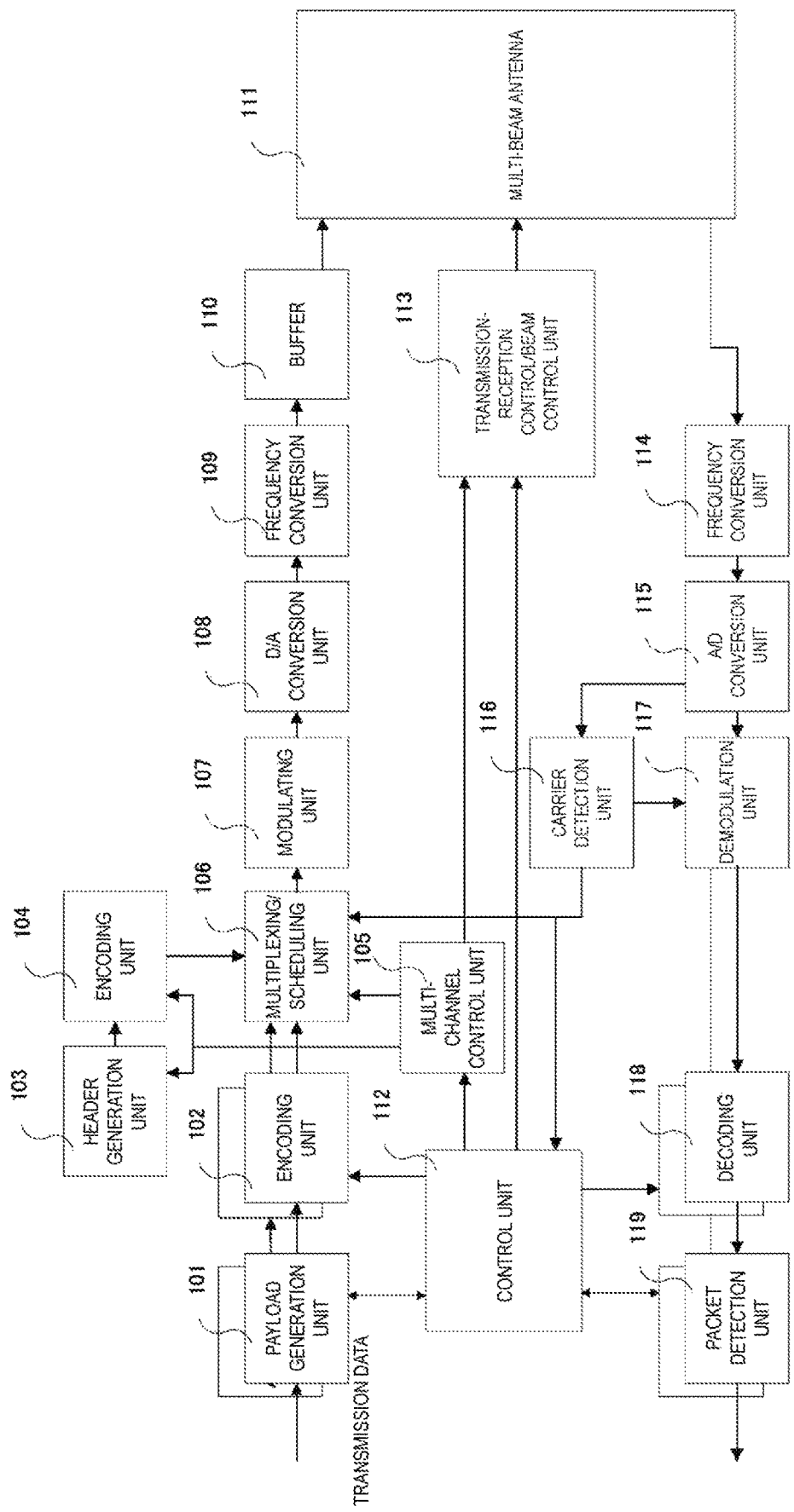
FIG. 1 is a functional block diagram illustrating an example of a constitution of a radio control station apparatus according to a first embodiment of the present invention.

Next, with reference to FIG. 1, an example of a constitution of the radio control station apparatus 201 configured to operate as discussed above will be described. A reference sign 101 denotes a payload generation unit configured to divide transmission data into pieces and generate a payload, a reference sign 102 denotes an encoding unit configured to encode payload data with error correction coding, a reference sign 105 denotes a multi-channel control unit configured to control which of the frequency channels is to be used for Frequency Division Multiplexing transmission, a reference sign 103 denotes a header generation unit configured to generate a header based on a control result by the multi-channel control unit, a reference sign 104 denotes an encoding unit configured to encode a transmission content of the header with error correction coding, a reference sign 106 denotes a multiplexing/scheduling unit configured to constitute a transmission packet including the payload data multiplexed with the header based on the encoded header data outputted from the encoding unit 104, the encoded payload data outputted from the encoding unit 102, and the control result by the multi-channel control unit 105, and output information associated with a modulation scheme of the transmission packet to a modulating unit, a reference sign 107 denotes the modulating unit configured to perform modulation based on the multiplexed transmission packet data and the information associated with the modulation scheme, and convert the data into a digital baseband signal, a reference sign 108 denotes a D/A conversion unit configured to perform digital-analog conversion on the digital baseband signal to convert the stated signal to an analog baseband signal using a bandpass filter to limit the band, a reference sign 109 denotes a frequency conversion unit configured to convert the analog baseband signal to a signal of a frequency band to be transmitted from a multi-beam antenna 111, a reference sign 110 denotes a buffer unit configured to amplify the signal outputted from the frequency conversion unit to the extent that the signal has power enabling stable operation of the multi-beam antenna 111, the reference sign 111 denotes the multi-beam antenna unit configured to control one or two beams at a transmission time or at a reception time, and configured to radiate a transmit signal to the beam obtained by amplifying the signal outputted from the buffer unit 110 and controlling the stated signal with predetermined power or receive a signal coming from a controlled beam direction, a reference sign 113 denotes a transmission-reception control/beam control unit configured to receive information associated with a transmission/reception timing and information associated with the beam control from the multi-channel control unit 105 and the control unit 112, and switch the transmission/reception operations and beams of the multi-beam antenna, a reference sign 114 denotes a frequency conversion unit configured to covert a reception signal outputted from the multi-beam antenna unit to an analog baseband signal, a reference sign 115 denotes an A/D conversion unit configured to convert the analog baseband signal to a digital baseband signal, a reference sign 116 denotes a carrier detection unit configured to detect whether a modulated carrier (carrier wave) is included in each of the frequency channels of the digital baseband signal, a reference sign 117 denotes a demodulation unit configured to demodulate the signal of each of the frequency channels included in the baseband signal in the case where it is detected by the carrier detection unit 117 that the carrier is included in the baseband signal, a reference sign 118 denotes a decoding unit configured to decode error correction coding applied to the demodulated signal, a reference sign 119 denotes a packet detection unit configured to detect a packet included in the demodulated signal and extract reception data and control data such as an ACK packet, and a reference sign 112 denotes a control unit configured to control the overall blocks, multiplex the transmission data, generate the transmission packets, control the transmission timing, and manage the beam control. The modulating unit 107 and the D/A conversion unit 108 configured to generate the baseband signal are collectively referred to as a baseband signal generator.

Transmission data generated in or inputted to the radio control station apparatus 201 that is destined for the radio terminal apparatuses 202a to 202d is all inputted to the payload generation unit. The control unit 112 monitors the transmission data inputted to the payload generation unit 101, controls the payload generation unit 101, the encoding unit 102, and the multi-channel control unit 105 based on the beams suited to the respective radio terminal apparatuses 202a through 202d, the channel state information, and the amount of transmission data that are previously estimated, and configures the number of frequency channels, a modulation scheme, and a transmission length of the transmission packet to be used for each of the radio terminal apparatuses. The payload generation unit 101 generates a payload based on the number of frequency channels, the modulation scheme, and the transmission length of the transmission packed, used for each of the radio terminal apparatuses, that are configured by the control unit 112. The generated payload is encoded in the encoding unit 102 and inputted to the multiplexing/scheduling unit 106. The multiplexing/scheduling unit 105, in accordance with the configuration made by the control unit 112, controls the header generation unit 103 and the encoding unit 104 to generate encoded header information including various kinds of control information, and inputs the encoded header information having been generated to the multiplexing/scheduling unit. At this time, preamble data is added to a portion corresponding to the forefront of the header section. The multiplexing/scheduling unit 106 generates transmission packet data from the encoded header information and the encoded payload information to be transmitted by the respective frequency channels based on the control of the control unit 112 and the multi-channel control unit 105, and inputs the generated transmission packet data and the modulation scheme to the modulating unit. At this time, the modulation scheme of the header may differ from the modulation scheme of the payload of each of the frequency channels, and the modulation schemes of different payloads of the frequency channels may differ from each other. The method for estimating the beams suited to each of the radio terminal apparatuses 202a through 202d and the channel state information is not limited to any specific one, and a method as follows may be used: the method is such that the control unit controls the multi-channel control unit 105 to generate a transmission packet constituted of only a preamble and a header, the multi-beam antenna unit 111 transmits the transmission packets each constituted of only the preamble and the header while selecting in sequence all kinds of beams capable of being configured, and the radio terminal apparatuses 202a to 202d are configured to report information associated with channels for the respective frequency channels of the transmission packets, thus the beams suitable for transmission and the channels for the respective frequency channels are estimated. Further, the control unit 112 and the multiplexing/scheduling unit 106 may determine, using the output from the carrier detection unit 116, whether any one of the frequency channels is being used, and may control to transmit a transmission packet in the case where the channel is not being used.

Figure 4A:
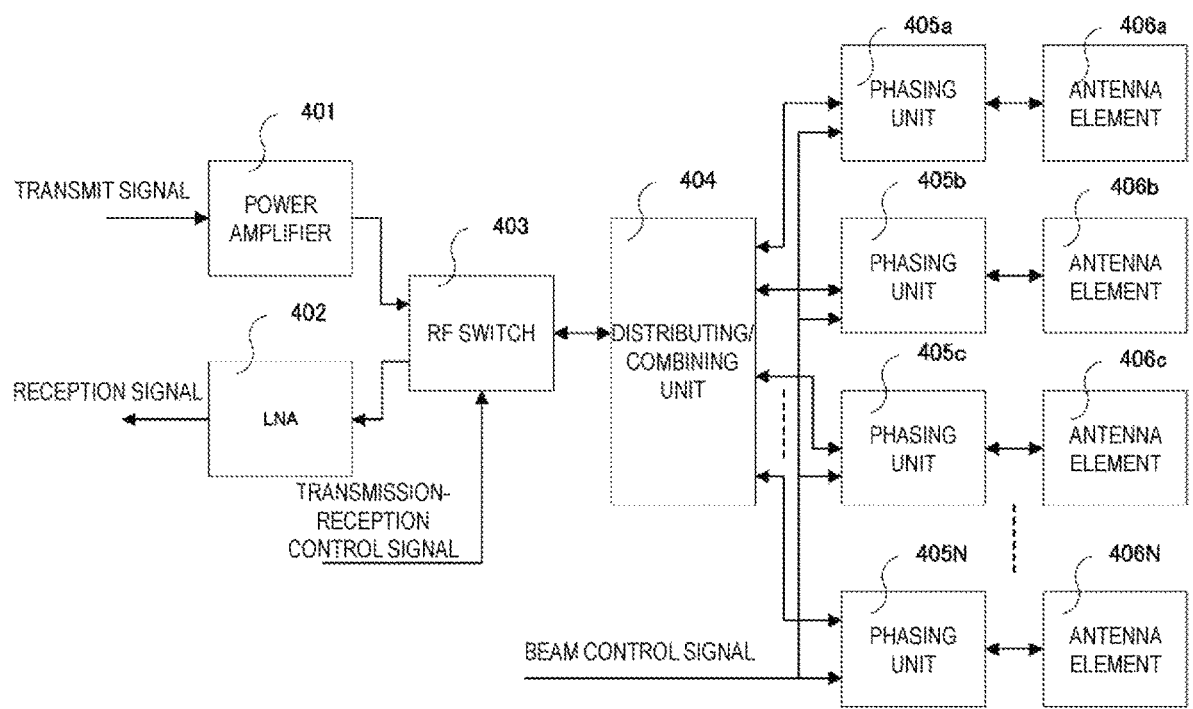
FIG. 4A is a functional block diagram illustrating an example of a constitution of a multi-beam antenna used in the first embodiment of the present invention.
Figure 4B:
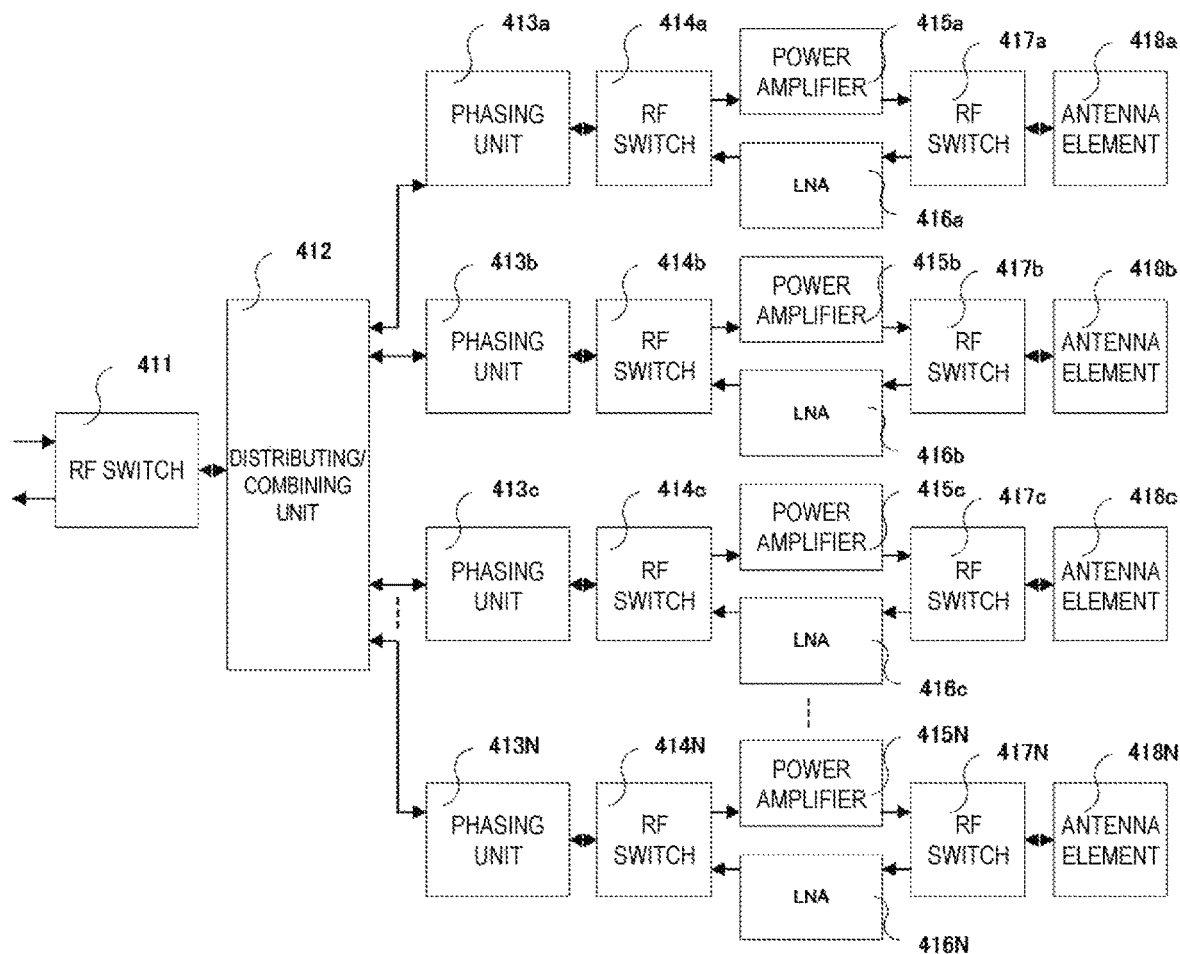
FIG. 4B is also a functional block diagram illustrating an example of a constitution of a multi-beam antenna used in the first embodiment of the present invention.

Next, an example of a constitution to achieve the multi-beam antenna 111 will be described with reference to FIG. 4A and FIG. 4B. FIG. 4A is a diagram illustrating an example of a constitution using a single power amplifier for transmit signal amplification and a single LNA for reception signal amplification, while FIG. 4B is a diagram illustrating an example of a constitution using power amplifiers of the number equal to the number of antenna elements and LNAs of the number equal to the number of antenna elements. In FIGS. 4A and 4B, the number of antenna elements is N, and subscripts of a to N are respectively attached to the portions that need constitution blocks of the number equal to the number of antenna elements. As the value of N, for example, 4, 6, 8, or the like can be used, and other mountable numbers other than these may be used.

A reference sign 401 denotes a power amplifier unit configured to amplify a transmit signal, a reference sign 402 denotes an LNA unit configured to amplify a reception signal, a reference sign 403 denotes an RF switch unit configured to switch a connection destination to grouped terminals of a distributing/combining unit 404 to any one of the power amplifier unit 401 and the RF switch unit 402 depending on an inputted transmission-reception control signal, the reference sign 404 denotes the distributing/combining unit configured to distribute power to terminals on the left side when a signal is inputted from the grouped terminals on the left side of the block, and also configured to output, when a signal is inputted from terminals on the right side, a signal to which the inputted signal is added to the grouped terminals on the left side, reference signs 405a to 405N denote phasing units configured to control the phases of signals to supply power to respective antenna elements 406a to 406N or control the phases of signals received by the antenna elements depending on an inputted beam control signal, and the reference signs 406a to 406N denote the antenna elements configured to radiate transmit signals whose phases are adjusted by the phasing units 405a to 405N into the air, or output signals received in the air to the phasing units 405a to 405N.

The antenna elements 406a to 406N are linearly arranged at equal intervals, in other words, are arranged in a similar manner to what is called the arrangement of a linear array antenna. In a case of one beam, when a constant phase difference is configured in the signals of the antenna elements 406a to 406N by making use of the phasing units 405a to 405N, a single beam direction is configured in a direction in accordance with phase differences among the antenna elements based on Huygens' principle. In a case of configuring a plurality of beams, groups of the same number as the number of necessary beams are configured in the antenna elements 406a to 406N of N in number, and a constant phase difference is configured in each of the groups. For example, in a case of a device including six antenna elements (406a to 406f), when two beams are to be configured, the antenna elements may be divided into two groups; for example, two groups each constituted of three antenna elements may be configured (406a to 406c and 406d to 406f), or one group constituted of four antenna elements and one group constituted of two antenna elements may be configured (406*a* to 406*d* and 406*e* to 406*f*). As the number of antenna elements within the same group is larger, the beam gain increases, and a directivity width of the beam or a half-value angle of the beam gain becomes narrower. In contrast, as the number of antenna elements within the same group is smaller, the beam gain becomes smaller, and the directivity width of the beam or the half-value angle of beam gain becomes wider. The half-value angle of the beam can be changed by the intervals of the antenna elements to be used, and can also be controlled by combinations of the antennas to be used. When two antenna elements are used, the half-value angle of the beam becomes narrow in a case where the beam is formed by using separate antenna elements in comparison with a case where the beam is formed by using adjacent antenna elements.

In addition to the constitution of FIG. 4A, as illustrated in FIG. 4B, a configuration may be employed in which power amplifier units 415*a* to 415N of the same number as the number of antenna elements 418*a* to 418N and LNA units 416*a* to 416N of the same number as the number of antenna elements 418*a* to 418N are prepared, and arranged near the antenna elements. In this case, alignment of the blocks from input to the antenna elements of the multi-beam antenna unit is as follows: an RF switch 411, a distributing/combining unit 412, phasing units 413*a* to 413N, RF switch units 414*a* to 414N, the power amplifier units 415*a* to 415N, the LNA units 416*a* to 416N, RF switch units 417*a* to 417N, and the antenna element units 418*a* to 418N. The portions having the same names include functions equivalent to those in FIG. 4A. In the constitution of FIG. 4B, the RF switch units 417*a* to 417N are disposed immediately in front of the antenna element units 418*a* to 418N; however, in order to omit the RF switch units 417*a* to 417N, a total number of 2N of the antenna element units 418*a* to 418N may be prepared and the antenna elements may be connected to each of the power amplifier units 415*a* to 415N and the LNA units 416*a* to 416N.

In the present embodiment, since the antenna elements 406*a* to 406N take a linear array form, the beam direction can be controlled only in a plane direction in which the antenna elements are arranged; however, the constitution may be such that the beam control can be managed in an up-down direction by a method in which the antenna elements are arranged in a three-dimensional lattice form or the like. Further, the arrangement of the antenna elements is not limited to a linear array form, a lattice form, or the like, and other arrangement capable of controlling the beam direction may be employed.

A multi-beam antenna having the above-mentioned characteristics can also be achieved by other methods. For example, the stated multi-beam antenna can be achieved with an antenna in which scattering elements making use of meta material are used, as disclosed in JP 2013-539949 T. This type of meta material antenna can control a null direction in addition to a main beam direction, can perform beam direction control in a three-dimensional direction, and thus can support various arrangement states in various radio terminal apparatuses.

Figure 7:
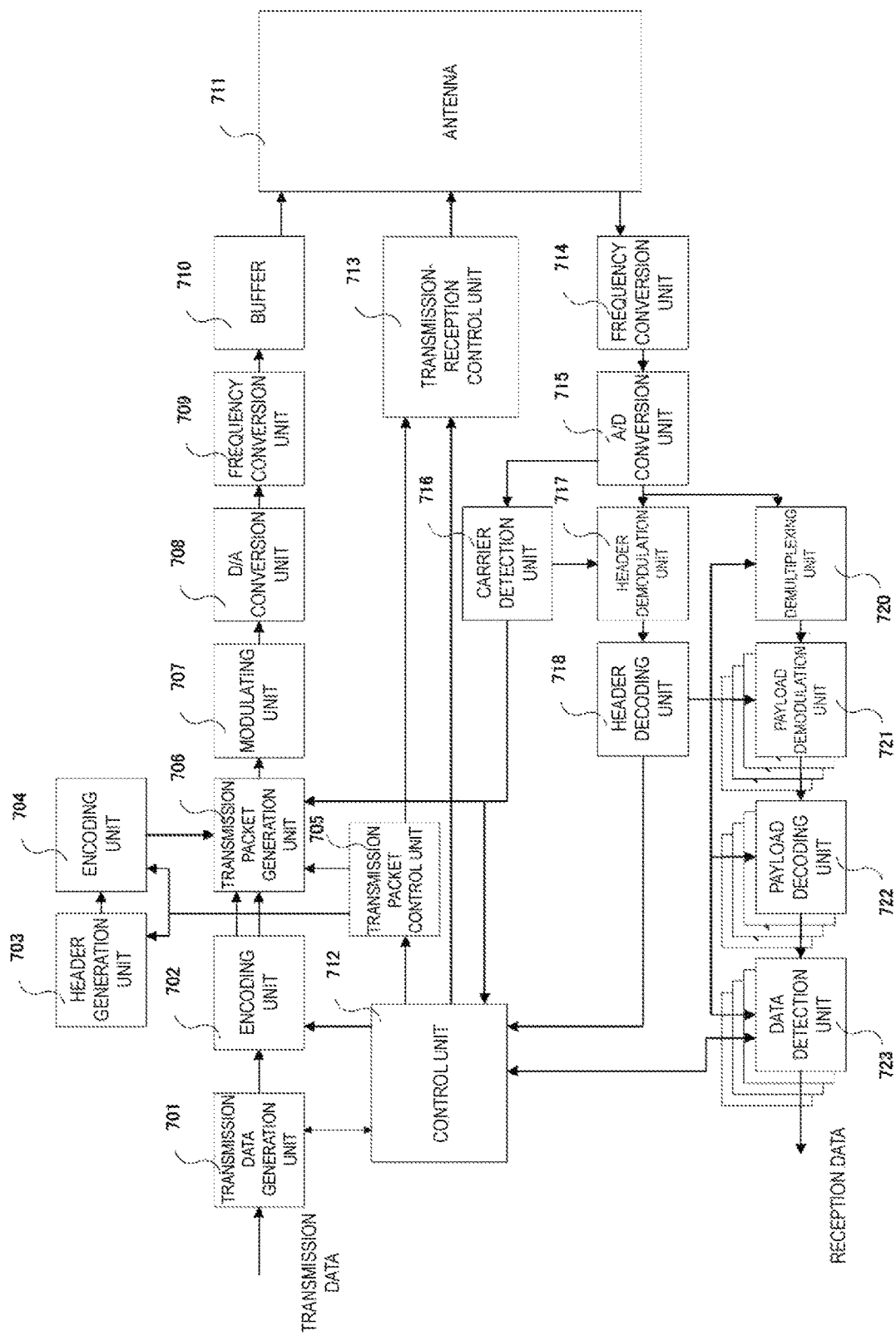
FIG. 7 is a functional block diagram illustrating an example of a constitution of a radio terminal apparatus according to the first embodiment of the present invention.

Next, an example of a constitution of each of the radio terminal apparatuses 202*a* to 202*d* will be described with reference to FIG. 7. Note that the radio terminal apparatuses 202*a* to 202*d* have the same constitution. An example of the constitution of one terminal will be give below. A reference sign 701 denotes a transmission data generation unit configured to divide inputted transmission data into a size of data that can be included in a transmission packet, generate data before encoding to be included in a single packet, and output the generated transmission packet data to a control unit 712, a reference sign 702 denotes an encoding unit configured to encode the transmission packet data, a reference sign 705 denotes a transmission packet control unit configured to output, to a header generation unit 703, information for generation of a transmission packet header by information inputted from the control unit, output, at a timing when an encoded header is generated, information for generation of an encoded transmission packet to a transmission packet generation unit 706, and output information of a transmission-reception switching timing to a transmission-reception control unit 713, the reference sign 703 denotes the header generation unit configured to generate information of the header before encoding based on the information inputted from the transmission packet control unit 705, a reference sign 704 denotes an encoding unit configured to encode the information inputted from the header generation unit with error correction coding, the reference sign 706 denotes the transmission packet generation unit configured to generate information of an encoded transmission packet from the encoded header information and the encoded transmission data information, and input the generated information to a modulating unit 707 along with information of a modulation scheme of the transmission packet, the reference sign 707 denotes the modulating unit configured to modulate the information of the encoded transmission packet inputted from the transmission packet generation unit 706 based on the information of the modulation scheme inputted from the transmission packet generation unit 706, and generate a digital baseband signal, a reference sign 708 denotes a D/A conversion unit configured to perform digital-analog (D/A) conversion on the digital baseband signal to generate an analog baseband signal through a bandpass filter, a reference sign 709 denotes a frequency conversion unit configured to perform frequency conversion on the analog baseband signal to obtain an RF signal that can be transmitted from an antenna unit, a reference sign 710 denotes a buffer unit configured to amplify the RF signal outputted from the frequency conversion unit 709 to the extent that the power of the RF signal causes stable operation of an antenna unit 711, the reference sign 711 denotes the antenna unit capable of switching to any one of transmission operation in which the input from the buffer unit 710 is further amplified and radiated into the air and reception operation in which an RF signal coming from the air is received, amplified and then outputted to a frequency conversion unit 714, in accordance with the information inputted from the transmission-reception control unit 713, the reference sign 713 denotes the transmission-reception control unit configured to switch operation of the antenna unit 711 between the transmission operation and the reception operation in accordance with the information inputted from the transmission packet control unit 705 or the control unit 712, the reference sign 714 denotes the frequency conversion unit configured to convert the RF signal inputted from the antenna unit 711 to an analog baseband signal, a reference sign 715 denotes an A/D conversion unit configured to perform analog-digital (A/D) conversion on an inputted analog baseband signal to obtain a digital baseband signal, a reference sign 716 denotes a carrier detection unit configured to detect whether a modulation signal (carrier) is included in the output of the A/D conversion unit, a reference sign 717 denotes a header demodulation unit configured to estimate, after the carrier having been detected, a channel between the radio control station apparatus and the radio terminal apparatus making use of an preamble included in a header, and demodulate, using the estimation result, a baseband signal in a portion where a header is included following the preamble, a reference sign 718 denotes a header decoding unit configured to perform decoding on the header information after demodulation inputted from the header demodulation unit 717 with error correction coding, and acquire information included in the header, a reference sign 720 denotes a demultiplexing unit configured to obtain information, inputted from the header decoding unit, associated with a payload to be demodulated, demultiplex a multiplexed baseband signal in the payload section, and output a signal of a frequency channel corresponding to the payload to be demodulated to a payload demodulation unit 721, the reference sign 721 denotes the payload demodulation unit configured to demodulate the signal of the frequency channel after demultiplexing based on the information associated with the payload inputted from the header demodulation unit, and output the demodulated signal to a payload decoding unit 722, the reference sign 722 denotes the payload decoding unit configured to decode the error correction coding with respect to the demodulated signal outputted from the payload demodulation unit 721, and output the decoded signal to a data detection unit 723, the reference sign 723 denotes the data detection unit configured to confirm whether the payload information included in the decoded payload signal is correct, report to the control unit 712, in a case of incorrectness being found, that the incorrectness has been found, take out the respective payload data as reception data in a case of no incorrectness being found, and output, in a case of control data being included in the payload, the stated control data to the control unit 712, and the reference sign 712 denotes the control unit configured to monitor the respective blocks and control the blocks as needed. The directivity of the antenna unit 711 is fixed, and has a wide beam width like non-directional or cardioid directivity. The beam width of the antenna unit 711 may be allowed to be narrow under a limited usage environment such as a case in which a positional relationship between the radio control station apparatus and the radio terminal apparatuses is determined in advance.

Figure 5:
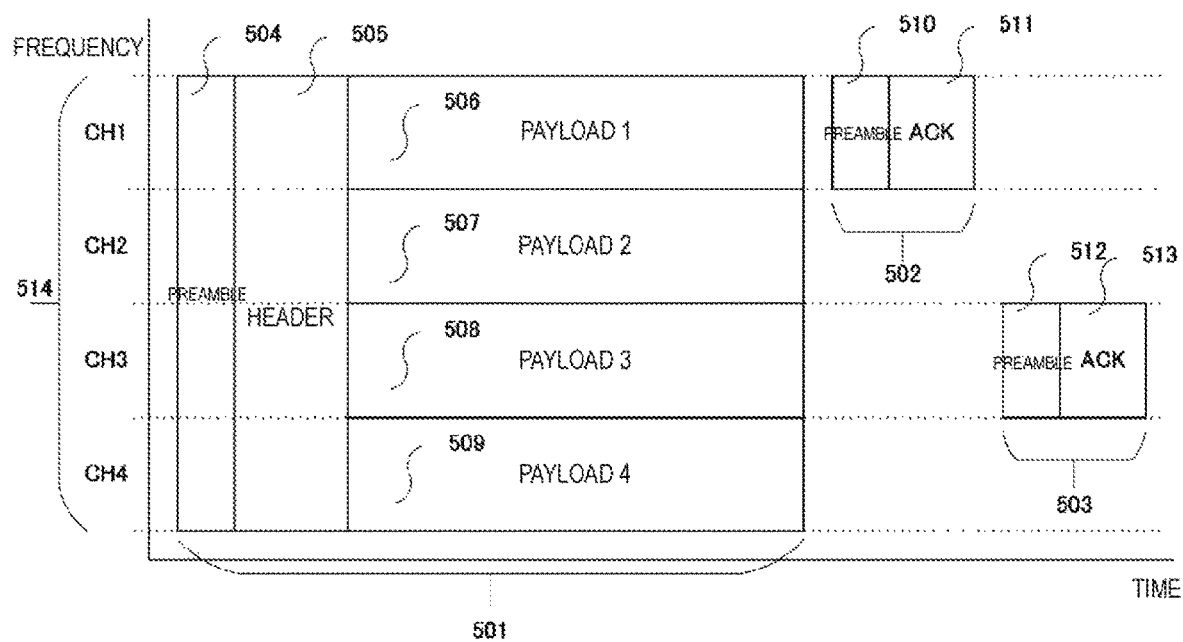
FIG. 5 is a diagram illustrating an example of a constitution of a packet format used in the first embodiment of the present invention.

A transmission packet transmitted from the radio terminal apparatus may use a format equivalent to the format of the ACK packets 502 and 503 illustrated in FIG. 5, and may be included in a transmission data transmission packet in place of the ACK data in the drawing. The transmission packet transmitted from the radio terminal apparatus may include a header section and a data section like a transmission packet transmitted from the radio control station apparatus, and the header section may include a transmission destination of the data section, control data such as a modulation scheme of the data section, and the like. Moreover, the data section may include various kinds of control data.

When the radio terminal apparatus 202*a* receives a signal in an interval indicated by t1 in FIG. 6A, the carrier detection unit 716 detects a preamble included in the header 601, and simultaneously with the above detection, the header demodulation unit 717 is controlled to estimate a channel by making use of the remaining preamble and demodulate the subsequent header. The header demodulation unit 717 demodulates the header and outputs the information after demodulation to the header decoding unit 718. The header decoding unit 718 decodes the error correction coding with respect to the inputted information after demodulation, extracts the information included in the header, and confirms whether the stated information includes an error. In a case where an error is included in the header, it is reported to the control unit 712 that the error is included in the header, and the subsequent decoding of the payload is stopped. Even in a case where no error is present in the decoded header, when information telling that at least one of the payloads to be subsequently transmitted is destined for the terminal itself is included in the information contained in the header, the header decoding unit 718 reports the information of the frequency channel including the payload to be demodulated to the demultiplexing unit 720, and also reports the number of payloads to be demodulated and the information of the modulation schemes of the payloads to the payload demodulation unit 721. In addition, the header decoding unit 718 reports, to the control unit 712, the information included in the header. In the case of the interval indicated by t1 in FIG. 6A, since the terminal 202*a* decodes payloads of the frequency channel CH1 and the frequency channel CH2, the header decoding unit outputs the configuration specifying that the frequency channel CH1 and the frequency channel CH2 are frequency channels to be decoded to the payload demodulation unit 721, and the demultiplexing unit 720 outputs the signals of the frequency channel CH1 and the frequency channel CH2 to the payload demodulation unit 721. The payload demodulation unit 712 demodulates the number of payloads inputted from the header decoding unit 718, in other words, demodulates the inputted signals of the frequency channel CH1 and the frequency channel CH2 based on the inputted information of the modulation schemes, and outputs the demodulated signals to the payload decoding unit 722. The payload decoding unit 722 decodes the error detection coding with respect to the inputted modulated data, and outputs the decoded payload information to the data detection unit 723. The data detection unit 723 makes sure that no error is present in the decoded payload information; however, in a case where an error has been found, the information of the payload where the error has been found is reported to the control unit 712. In a case where no error has been found, the data detection unit 723 reports, to the control unit 712, that the payload has been successfully received, and outputs, as reception data, the transmission data transmitted from the radio control station apparatus 201 included in the payload; further, in a case where control information is included in the payload, the data detection unit 723 outputs the stated control information to the control unit 712. When the control unit receives the report of information from the data detection unit 723 telling the successful reception of the payload, the control unit controls the transmission data generation unit 702, the encoding unit 702 and the transmission packet control unit 705, and transmits the ACK packet 604 to the radio control station apparatus 201, using the frequency channel CH1 specified by the header 601.

The radio terminal apparatus 202*c* also operates in a similar manner to that of the radio terminal apparatus 202*a*. The header 601 having been received is demodulated and decoded, and the payloads 603 of the frequency channel CH3 and the frequency channel CH4 are demodulated and decoded in accordance with the information included in the header 601; in a case where they are successfully decoded, after a period of time during which the radio terminal apparatus 202*a* transmits the ACK packet 604 and an additional time configured beforehand having passed, the ACK packet 605 is transmitted through the frequency channel CH3.

Operations are also similarly carried out in an interval indicated by t2; that is, the radio terminal apparatus 202*b* and the radio terminal apparatus 202*d* demodulate and decode the header 606, and the respective radio terminal apparatuses demodulate and decode the payloads 607 of the frequency channels CH1 and CH2 and the payloads 608 of the frequency channels CH3 and CH4 in accordance with the information included in the header. In a case where the radio terminal apparatuses have respectively succeeded in decoding the payloads, the radio terminal apparatus 202b transmits the ACK packet 609 with the frequency channel CH2 and the radio terminal apparatus 202d transmits the ACK packet 610 with the frequency channel CH4 in accordance with the information included in the header 606.

Operations are also carried out in a similar manner in a case where the frequency channels being multiplexed (the number of payloads) illustrated in FIG. 6B differ. The radio terminal apparatus 202a and the radio terminal apparatus 202c demodulate and decode the header 611; the radio terminal apparatus 202a demodulates the payload 612 of the frequency channel CH1, and the radio terminal apparatus 202c demodulates the payloads 613 of the frequency channels CH2, CH3, and CH4; the radio terminal apparatus 202a transmits the ACK packet 614 with the frequency channel CH1, and the radio terminal apparatus 202c transmits the ACK packet 615 with the frequency channel CH4. Further, the radio terminal apparatus 202b and the radio terminal apparatus 202d demodulate and decode the header 616; the radio terminal apparatus 202b receives the payloads 617 of the frequency channels CH1, CH2 and CH3, and the radio terminal apparatus 202d receives the payload 618 of the frequency channel CH4. Thereafter, the radio terminal apparatus 202b transmits the ACK packet 619 with the frequency channel CH2, and the radio terminal apparatus 202d transmits the ACK packet 620 with the frequency channel CH4.

With the operations as discussed above, it is possible to enhance the communication efficiency by controlling a plurality of beams and frequency channels to be multiplexed in the radio control station apparatus including one RF system for transmission (D/A conversion unit, frequency conversion unit, buffer unit) and one RF system for reception (frequency conversion unit, A/D conversion unit). In the present embodiment, there are one transmission RF system and one reception RF system, and the number of beams to be controlled is two. However, the present invention can be applied to an apparatus constitution in which the number of beams to be controlled is greater than the number of RF systems for transmission and reception. In the present embodiment, there are one transmission RF system and one reception RF system, and the number of beams to be controlled is two. However, the present invention can be applied to an apparatus constitution in which the number of beams to be controlled is greater than the number of RF systems for transmission or reception. Note that the "RF system for transmission" may be read as the above-mentioned "baseband signal generator".

Second Embodiment

In the first embodiment, a case in which simultaneous communication is carried out using a plurality of radio terminal apparatuses and Frequency Division Multiplexing is described. In the second embodiment, a constitution as follows will be described: a multi-beam antenna capable of controlling two beams is used, communication with one radio terminal apparatus is carried out using one of the beams, and a search for another radio terminal apparatus is carried out using the other one of the beams and a frequency resource for search having undergone Frequency Division.

Figure 8:
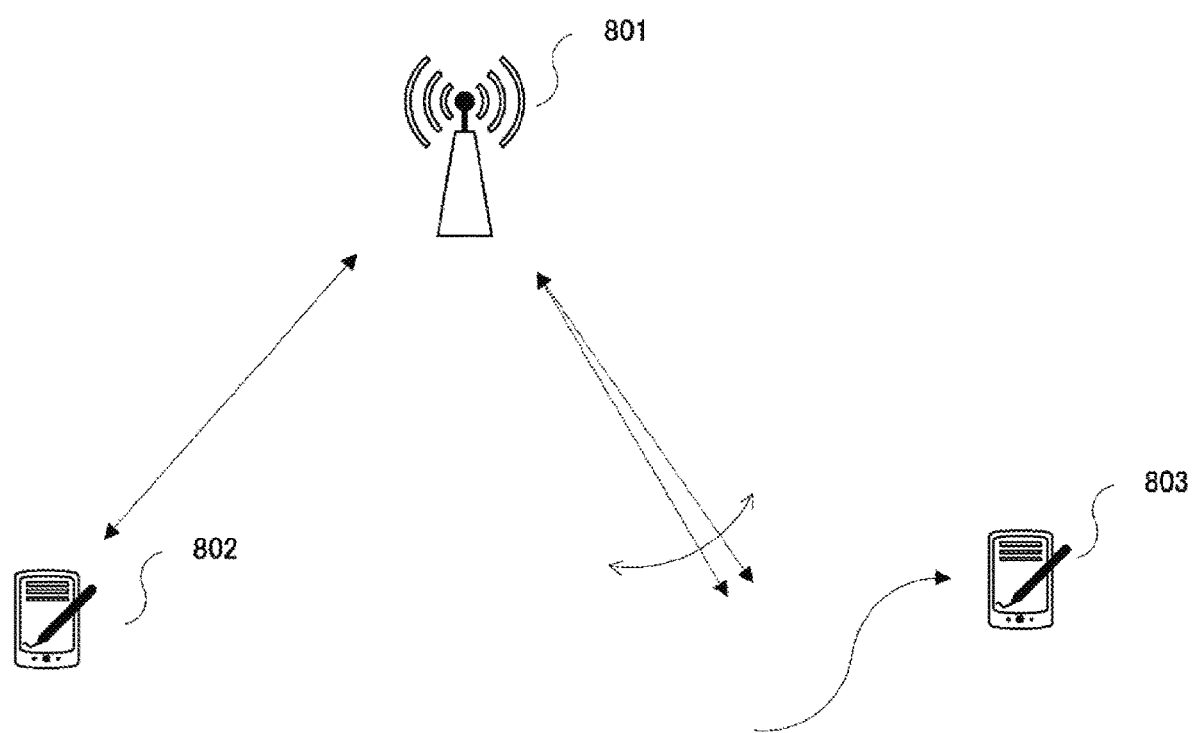
FIG. 8 is a diagram illustrating an example of a radio communication system used in a second embodiment of the present invention.

FIG. 8 illustrates an outline of the present embodiment. In the manner as described in the first embodiment, a radio control station apparatus 801 communicates with radio terminal apparatuses 802 and 803 while making use of Frequency Division Multiplexing and a multi-beam antenna. During the above-mentioned communication, the radio terminal apparatus 803 moves so that the communication link is cut, and the radio control station apparatus 801 changes a beam direction to search for the radio terminal apparatus 803. The radio control station apparatus 801 and the radio terminal apparatuses 802, 803 each use similar constitutions to those used in the first embodiment.

Figure 9:
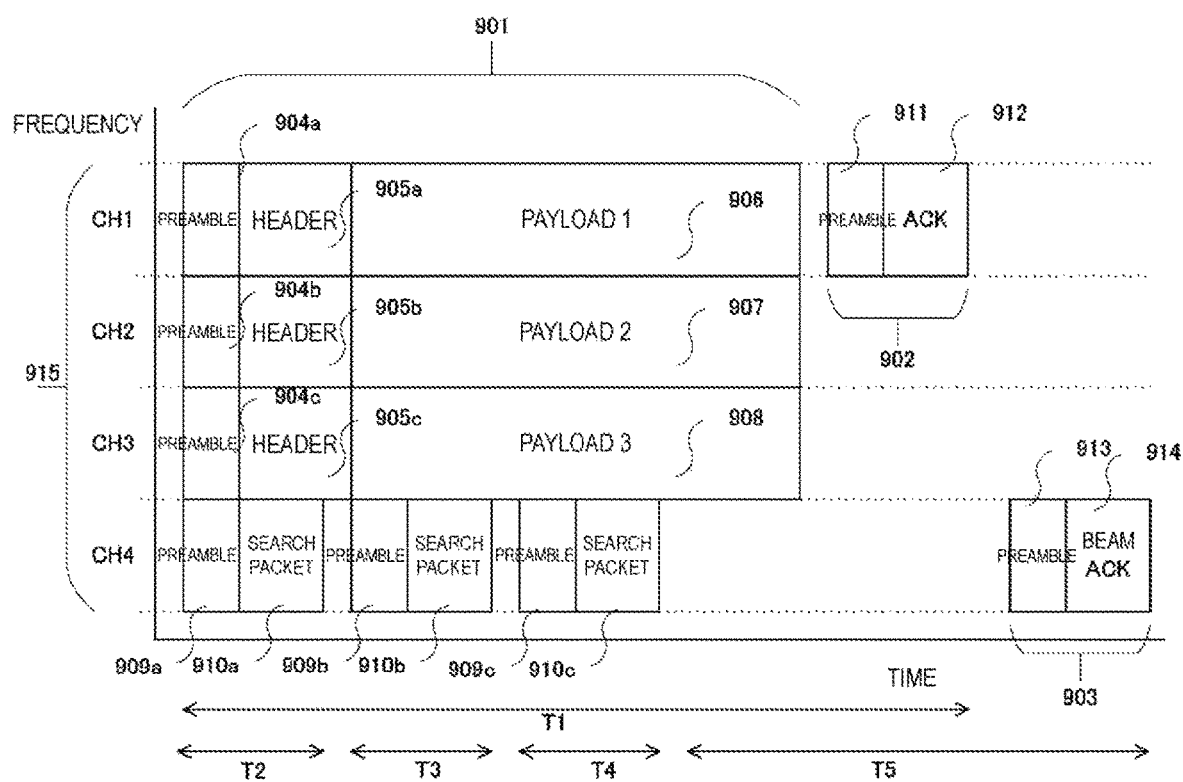
FIG. 9 is a diagram illustrating an example of a constitution of a packet format used in the second embodiment of the present invention.

The number of frequency channels used for communication is four, which is the same number as that of the first embodiment. FIG. 9 illustrates an example of a case in which, using these frequency channels, a search for the radio terminal apparatus 803 is carried out using Frequency Division Multiplexing while the communication with the radio terminal apparatus 802 is carried out. The radio control station apparatus 801 can use frequency channels CH1, CH2, CH3, and CH4. When the radio terminal apparatus performs transmission, any one of the four frequency channels is used. "901" denotes a transmission packet transmitted by the radio control station apparatus, while "902" and "903" denote transmission packets transmitted by the radio terminal apparatuses.

The transmission packet 901 transmitted from the radio control station apparatus transmits data to the radio terminal apparatus 802 using the three frequency channels CH1, CH2 and CH3, and searches for the radio terminal apparatus 803 using the frequency channel CH4. The radio control station apparatus 801 controls two beams at the same time, like in the case of the first embodiment. During a period of time T1, one of the beams is directed toward the radio terminal apparatus 802, which has been found beforehand, and then preambles 904a, 904b and 904c, headers 905a, 905b and 905c, and payloads 906, 907 and 908 are transmitted. Thereafter, the radio terminal apparatus 802 demodulates the payloads 906, 907, and 908 making use of the preambles 904a, 904b and 904c, and the headers 905a, 905b and 905c. Then, in a case where all the payloads are successfully demodulated, the ACK packet 902 is transmitted making use of the frequency channel CH1. The ACK packet 902 is constituted of a preamble 911 and ACK data 912. A plurality of frequency channels may be used for transmitting search packets. However, in the case where the number of frequency channels used for the search is increased, the number of frequency channels that can be used for the communication is decreased in turn. As such, the number of frequency channels used for transmitting search packets is determined to be one in the present embodiment.

A method for searching for the radio terminal apparatus 803 is not limited to any specific one as long as the method uses the frequency channel CH4. Here, as an example, a method conforming to the method used in IEEE802.11ad is used. In this method, a plurality of times during which search packets are to be transmitted are prepared, and a search packet is transmitted at each of the times with a beam direction being changed. Thereafter, the beam is configured to be a non-directional beam or a wide beam conforming to the non-directional beam. Then, a beam ACK packet transmitted from the target radio communication apparatus reports which packet in which direction is suitable for the communication, and the subsequent communication uses the beam that was used when the above search packet was transmitted. FIG. 9 illustrates an example in which the radio control station apparatus 801 transmits search packets three times, and thereafter a beam ACK packet is transmitted from the radio terminal apparatus 803. Beam directions in periods T2, T3, and T4 differ from each other; a preamble 909a and a search packet 910 are transmitted at T2, a preamble 909b and a search packet 909b are transmitted at T3, and a preamble 909c and a search packet 910c are transmitted at T4. In each of the search packets, information as follows may be included: information indicating that the packet is a packet for searching for the terminal apparatus 803, information for identifying each individual search packet, information indicating how many times search packets are supposed to be transmitted from now, information of a transmission start time indicating a time at which the beam ACK packet is allowed to be transmitted later than now, and the like. After all the search packets have been transmitted, the radio control station apparatus 801 configures a beam used for performing transmission with the radio terminal apparatus 803 to be wide at a period T5. The radio terminal apparatus 803 transmits the beam ACK packet 903 including information identifying the search packet with the best quality among the plurality of search packets having been transmitted, such as identification information included in the search packet or information of the time when the search packet was transmitted, for example. When the radio control station apparatus 801 receives the beam ACK packet 903, the radio control station apparatus 801 can continue communication by configuring the beam used for the subsequent communication with the radio terminal apparatus 803 based on the information included in the beam ACK packet 903.

With the operations as discussed above, in the radio control station apparatus including one RF system for transmission (D/A conversion unit, frequency conversion unit, buffer unit) and one RF system for reception (frequency conversion unit. A/D conversion unit), it is possible, while performing transmission of beamforming toward a certain communication apparatus, to perform beam control with respect to another communication apparatus at the same time. In the present embodiment, there are one transmission RF system and one reception RF system, and the number of beams to be controlled is two. However, the present invention can be applied to an apparatus constitution in which the number of beams to be controlled is greater than the number of RF systems for transmission or reception. Note that the "RF system for transmission" may be read as the above-mentioned "baseband signal generator".

Third Embodiment

In the first embodiment and the second embodiment, modes in which a radio control station apparatus includes a multi-beam antenna unit are described. In the present embodiment, a mode in which a multi-beam antenna unit is provided on a radio terminal apparatus side will be described with reference to the drawings.

Figure 10:
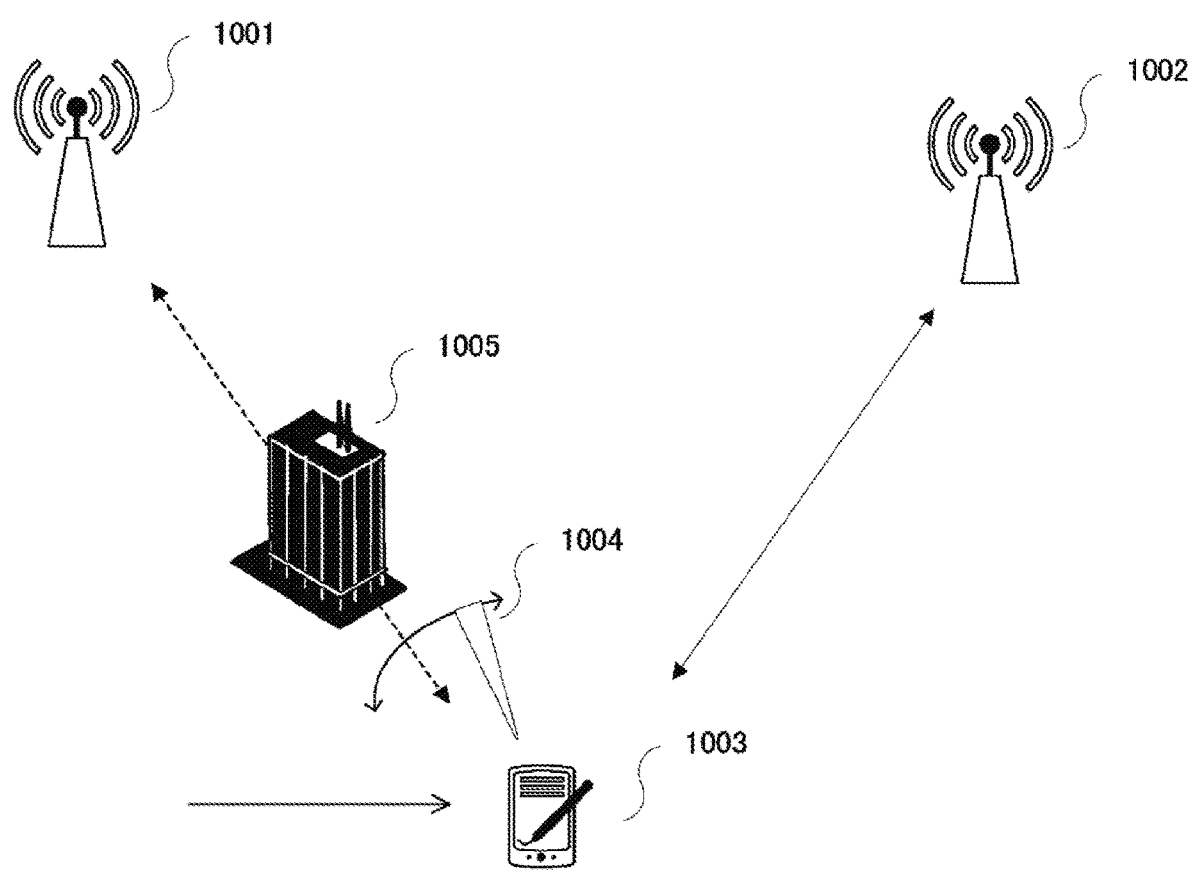
FIG. 10 is a diagram illustrating an example of a radio communication system used in a third embodiment of the present invention.

FIG. 10 illustrates an outline of the present embodiment. The present embodiment uses two radio control station apparatuses 1001 and 1002, and a single radio terminal apparatus 1003. The radio terminal apparatus 1003 communicates with each of the radio control station apparatuses 1001 and 1002. The radio terminal apparatus 1003 configures a beam of a multi-beam antenna unit for each of the two radio control station apparatuses 1001 and 1002. In the case where different frequency channels are used for each of the two radio control station apparatuses 1001 and 1002, the transmission may be carried out toward the radio control station apparatuses 1001 and 1002 at the same time. These two communication paths may be used to increase a communication speed, or may be used as a redundant constitution to enhance resistance against communication failure. In a case where communication between the radio terminal apparatus 1003 and the radio control station apparatus 1001 is blocked by a certain construction 1005, the radio terminal apparatus 1003 may control a beam 1004 used for the radio control station apparatus 1001 and perform beam searching with respect to the radio control station apparatus 1001 while performing transmission toward the radio control station apparatus 1002. Various kinds of methods can be used as the beam searching. For example, a method equivalent to the method in IEEE802.11ad discussed in the second embodiment may be used. Various kinds of constitutions can be used as a constitution of the radio terminal apparatus. For example, a constitution similar to the constitution of the radio control station apparatus described in FIG. 1 may be used.

As described above, the radio terminal apparatus 1003 configures the beams of the multi-beam antenna units for the two radio control station apparatuses 1001 and 1002, and can communicate with the two radio control station apparatuses using different frequency channels. Further, the radio terminal apparatus uses any one of the beams of the multi-beam antenna units, and can perform beam searching, while communicating with any one of the radio control station apparatuses, with respect to another one of the radio control station apparatuses. As described thus far, the communication efficiency can be enhanced while enhancing the resistance against communication failure.

A program running on each of the base station apparatus and the terminal apparatus according to an aspect of the present invention is a program (a program for causing a computer to operate) that controls a CPU and the like in such a manner as to enable the functions according to the above-described embodiments of the present invention. The information handled by these devices is temporarily held in a RAM at the time of processing, and is then stored in various types of ROMs, HDDs, and the like, and read out by the CPU as necessary to be edited and written. Here, a semiconductor medium (a ROM, a non-volatile memory card, or the like, for example), an optical recording medium (DVD, MO, MD, CD, BD, or the like, for example), a magnetic recording medium (a magnetic tape, a flexible disk, or the like, for example), and the like can be given as examples of recording media for storing the programs. In addition to enabling the functions of the above-described embodiments by performing loaded programs, the functions of the present invention are enabled by the programs running cooperatively with an operating system, other application programs, or the like in accordance with instructions included in those programs.

In a case that delivering these programs to market, the programs can be stored in a portable recording medium, or transferred to a server computer connected via a network such as the Internet. In this case, the storage device serving as the server computer is also included in the present invention. Furthermore, some or all portions of each of the terminal apparatus and the base station apparatus in the above-described embodiments may be achieved as LSI, which is a typical integrated circuit. The functional blocks of the reception device may be individually achieved as chips, or may be partially or completely integrated into a chip. In a case that the functional blocks are integrated into a chip, an integrated circuit control unit for controlling them is added.

The circuit integration technique is not limited to LSI, and the integrated circuits for the functional blocks may be achieved as dedicated circuits or a multi-purpose processor. Furthermore, in a case where with advances in semiconductor technology, a circuit integration technology with which an LSI is replaced appears, it is also possible to use an integrated circuit based on the technology.

Note that the invention of the present patent application is not limited to the above-described embodiments. The terminal device according to the invention of the present patent application is not limited to the application in the mobile station device, and, needless to say, can be applied to a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiments of the invention have been described in detail thus far with reference to the drawings, but the specific configuration is not limited to the embodiments. Other designs and the like that do not depart from the essential spirit of the invention also fall within the scope of the claims.

INDUSTRIAL APPLICABILITY

The present invention can be used in radio communication devices.

The present international application claims priority based on JP 2016-010457 filed on Jan. 22, 2016, and all the contents of JP 2016-010457 are incorporated in the present international application by reference.

DESCRIPTION OF REFERENCE NUMERALS

101 Payload generation unit
102 Encoding unit
103 Header generation unit
104 Encoding unit
105 Multi-channel control unit
106 Multiplexing/scheduling unit
107 Modulating unit
108 D/A conversion unit
109 Frequency conversion unit
110 Buffer unit
111 Multi-beam antenna unit
112 Control unit
113 Transmission-reception control/beam control unit
114 Frequency conversion unit
115 A/D conversion unit
116 Carrier detection unit
117 Demodulation unit
118 Decoding unit
119 Packet detection unit
201 Radio control station apparatus
202a to 202d Radio terminal apparatus
401 Power amplifier unit
402 LNA unit
403 RF switch unit
404 Distributing/combining unit
405a to 405N Phasing unit
406a to 406N Antenna element unit
411 RF switch unit
412 Distributing/combining unit
413a to 413N Phasing unit
414a to 414N RF switch unit
415a to 415N Power amplifier unit
416a to 416N LNA unit
417a to 417N RF switch unit
418a to 418N Antenna element unit
701 Transmission data generation unit
702 Encoding unit
703 Header generation unit
704 Encoding unit
705 Transmission packet control unit
706 Transmission packet generation unit
707 Modulating unit
708 D/A conversion unit
709 Frequency conversion unit
710 Buffer unit
711 Antenna unit
712 Control unit
713 Transmission-reception control unit
714 Frequency conversion unit
715 A/D conversion unit
716 Carrier detection unit
717 Header demodulation unit
718 Header decoding unit
720 Demultiplexing unit
721 Payload demodulation unit
722 Payload decoding unit
723 Data detection unit
801 Radio control station apparatus
802 to 803 Radio terminal apparatus

The invention claimed is:

1. A radio control station apparatus in a radio communication system comprising the radio control station apparatus and a plurality of radio terminal apparatuses, the radio control station apparatus comprising:
a multi-beam antenna; and
at least one radio frequency, RF, system for transmission, wherein the at least one RF system for transmission includes a multiplexer configured to
perform multiplexing by using a plurality of frequency channels or a plurality of sub-carriers,
allocate at least one of the plurality of different frequency channels or at least one of the plurality of different sub-carriers to each of a plurality of transmit signals to be transmitted to the plurality of radio terminal apparatuses,
multiplex the allocated frequency channels or sub-carriers in the multiplexer, and
transmit a multiplexed signal through the multi-beam antenna using a plurality of beams,
wherein a search packet is transmitted with any one of the plurality of beams,
wherein a number of the plurality of frequency channels used in a case of transmitting the search packet is one, and
wherein, in a case that the search packet is transmitted, the plurality of frequency channels other than the plurality of frequency channels used for transmitting the search packet are used for data transmission to the plurality of radio terminal apparatuses.

2. The radio control station apparatus according to claim 1, wherein a number of the at least one RF system for transmission is less than a number of the plurality of beams.

3. The radio control station apparatus according to claim 1, wherein, in a case that any one of a plurality of beams of the multi-beam antenna is allocated to any one of the plurality of radio terminal apparatuses, a number of the plurality of frequency channels allocated to the beam-allocated radio terminal apparatus is changed in accordance with gain of an allocated beam.

4. The radio control station apparatus according to claim 1, wherein the radio control station apparatus receives a signal from the plurality of radio terminal apparatuses to which the plurality of different frequency channels or the plurality of sub-carriers were allocated, the reception of the signal performed by using a configuration configured in the multi-beam antenna, the configuration used at a time when transmit data was transmitted to the plurality of radio terminal apparatuses to which the frequency channels or sub-carriers were allocated.

5. A control method used by a radio control station apparatus in a radio communication system comprising the radio control station apparatus and a plurality of radio terminal apparatuses, the control method comprising:

using at least one radio frequency, RF, system for transmission, wherein the at least one RF system including a multi-beam antenna, and a multiplexer configured to perform multiplexing by using a plurality of frequency channels or a plurality of sub-carriers;

allocating at least one of the plurality of different frequency channels or at least one of the plurality of different sub-carriers to each of a plurality of transmit signals to be transmitted to the plurality of radio terminal apparatuses;

multiplexing the allocated frequency channels or sub-carriers in the multiplexer; and transmitting a multiplexed signal through the multi-beam antenna unit using a plurality of beams, wherein a search packet is transmitted with any one of the plurality of beams, wherein a number of the plurality of frequency channels used in a case of transmitting the search packet is one, and wherein, in a case that the search packet is transmitted, the plurality of frequency channels other than the plurality of frequency channels used for transmitting the search packet are used for data transmission to the plurality of radio terminal apparatuses.

* * * * *